United States Patent
Katase et al.

(10) Patent No.: US 7,314,281 B2
(45) Date of Patent: Jan. 1, 2008

(54) PROJECTION DISPLAY DEVICE

(75) Inventors: Makoto Katase, Hotaka-machi (JP); Junji Ajioka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 336 days.

(21) Appl. No.: 11/127,273

(22) Filed: May 12, 2005

(65) Prior Publication Data

US 2005/0280784 A1 Dec. 22, 2005

(30) Foreign Application Priority Data

Jun. 18, 2004 (JP) ............................. 2004-181063

(51) Int. Cl.
- G03B 21/22 (2006.01)
- G03B 21/14 (2006.01)
- G03B 21/56 (2006.01)
- F16M 13/00 (2006.01)
- H04N 5/64 (2006.01)

(52) U.S. Cl. ........................... 353/77; 353/78; 353/119; 359/443; 359/460; 359/461; 348/840; 248/158

(58) Field of Classification Search .................. 353/72, 353/74, 77, 78, 79, 94, 119; 359/460, 461, 359/443; 348/744, 840; 349/6, 7, 8, 9; 248/158
See application file for complete search history.

(56) References Cited

U.S. PATENT DOCUMENTS

| | | | | |
|---|---|---|---|---|
| 4,439,027 A | * | 3/1984 | Shioda et al. ................. | 353/77 |
| 5,434,631 A | * | 7/1995 | Lieberman et al. ......... | 353/119 |
| 2001/0026247 A1 | * | 10/2001 | Nishio et al. .................. | 345/4 |
| 2007/0121206 A1 | * | 5/2007 | Liang et al. ................. | 359/443 |
| 2007/0153375 A1 | * | 7/2007 | Peterson et al. ............ | 359/443 |

FOREIGN PATENT DOCUMENTS

JP U-01-115778 8/1989

* cited by examiner

Primary Examiner—Melissa Jan Koval
(74) Attorney, Agent, or Firm—Oliff & Berridge, PLC

(57) ABSTRACT

A projection display device having a plurality of transmission screens, each having an image display portion of different dimension, and each having light transmissivity and being provided with a back surface layer having optical directivity on a back surface side; a main body capable of projecting a projection light, and a optical unit that guides the projection light from the projection device main body to the back surface of the transmission screen; and a supporting unit that supports one transmission screen selected from the plural transmission screens and the projection device main body. An image is displayed on the transmission screen by allowing the projection light guided by the optical unit to pass through from the back surface side. One transmission screen is selected, and the selected transmission screen, the projection device main body, the optical unit, and the supporting unit are assembled for use.

18 Claims, 12 Drawing Sheets

| | SCREEN | OPTICAL UNIT | PROJECTOR MAIN BODY | FRAME |
|---|---|---|---|---|
| CONFIGURATION #1 | SCREEN 32 (32-INCH REAR SCREEN) | LENS UNIT 22 & MIRROR 31 (32-INCH TYPE OPTICAL UNIT) | PROJECTOR MAIN BODY 25 (STANDARD LAMP BODY WITH RESOLUTION: 525 p) | FRAME 6 |
| CONFIGURATION #2 | SCREEN 48 (48-INCH REAR SCREEN) | LENS UNIT 22 & MIRROR 33 (48-INCH TYPE OPTICAL UNIT) | PROJECTOR MAIN BODY 26 (STANDARD LAMP BODY WITH RESOLUTION: 750 p) | FRAME 6 |
| CONFIGURATION #3 | SCREEN 64 (64-INCH REAR SCREEN) | LENS UNIT 22 & MIRROR 34 (64-INCH TYPE OPTICAL UNIT) | PROJECTOR MAIN BODY 26 (STANDARD LAMP BODY WITH RESOLUTION: 750 p) | FRAME 6 |
| CONFIGURATION #4 | SCREEN 48 (48-INCH REAR SCREEN) | ZOOM LENS UNIT 24 & MIRROR 33 (48 TO 32-INCH TYPE ZOOM) | PROJECTOR MAIN BODY 26 (STANDARD LAMP BODY WITH RESOLUTION: 750 p) | FRAME 6 |
| CONFIGURATION #5 | SCREEN 64 (64-INCH REAR SCREEN) | ZOOM LENS UNIT 24 & MIRROR 34 (64 TO 48-INCH TYPE ZOOM) | PROJECTOR MAIN BODY 27 (HIGH-LUMINANCE LAMP BODY WITH RESOLUTION: 750 p) | FRAME 6 |
| CONFIGURATION #6 | FLEXIBLE SCREEN 100 | ZOOM LENS UNIT 24 & MIRROR 34 (64 TO 48-INCH TYPE ZOOM) | PROJECTOR MAIN BODY 27 (HIGH-LUMINANCE LAMP BODY WITH RESOLUTION: 750 p) | FRAME 60 |

| | SCREEN | OPTICAL UNIT | PROJECTOR MAIN BODY | FRAME |
|---|---|---|---|---|
| CONFIGURATION #1 | SCREEN 32 (32-INCH REAR SCREEN) | LENS UNIT 22 & MIRROR 31 (32-INCH TYPE OPTICAL UNIT) | PROJECTOR MAIN BODY 25 (STANDARD LAMP BODY WITH RESOLUTION: 525 p) | FRAME 6 |
| CONFIGURATION #2 | SCREEN 48 (48-INCH REAR SCREEN) | LENS UNIT 22 & MIRROR 33 (48-INCH TYPE OPTICAL UNIT) | PROJECTOR MAIN BODY 26 (STANDARD LAMP BODY WITH RESOLUTION: 750 p) | FRAME 6 |
| CONFIGURATION #3 | SCREEN 64 (64-INCH REAR SCREEN) | LENS UNIT 22 & MIRROR 34 (64-INCH TYPE OPTICAL UNIT) | PROJECTOR MAIN BODY 26 (STANDARD LAMP BODY WITH RESOLUTION: 750 p) | FRAME 6 |
| CONFIGURATION #4 | SCREEN 48 (48-INCH REAR SCREEN) | ZOOM LENS UNIT 24 & MIRROR 33 (48 TO 32-INCH TYPE ZOOM) | PROJECTOR MAIN BODY 26 (STANDARD LAMP BODY WITH RESOLUTION: 750 p) | FRAME 6 |
| CONFIGURATION #5 | SCREEN 64 (64-INCH REAR SCREEN) | ZOOM LENS UNIT 24 & MIRROR 34 (64 TO 48-INCH TYPE ZOOM) | PROJECTOR MAIN BODY 27 (HIGH-LUMINANCE LAMP BODY WITH RESOLUTION: 750 p) | FRAME 6 |
| CONFIGURATION #6 | FLEXIBLE SCREEN 100 | ZOOM LENS UNIT 24 & MIRROR 34 (64 TO 48-INCH TYPE ZOOM) | PROJECTOR MAIN BODY 27 (HIGH-LUMINANCE LAMP BODY WITH RESOLUTION: 750 p) | FRAME 60 |

FIG. 1

PROJECTION DISPLAY DEVICE

BACKGROUND

Exemplary embodiments of the present invention relate to a projection display device.

Related art document JP-UM-A-1-115778 discloses rear projection display device, in which the entire optical system is accommodated in the cabinet. FIG. 19 is a schematic showing the configuration of the rear projection display device disclosed in the related art. The projection display device shown in FIG. 19 has a projection device 200 including an enclosure and a projection lens, a folding mirror 201, a transmission screen 202, and a cabinet 203. The viewer watches an enlarged image on the transmission screen 202 from a direction opposite to the projection device 200.

Because the entire optical system is accommodated in the cabinet in the rear projection display device, a projection light will not be shielded by an individual or furniture. In addition, because contrast deterioration is small under normal interior illumination and the cabinet, which is relatively small, is set near the wall or at a corner of the room, the rear projection display device does not present a problem in the layout at the center of the room.

Incidentally, in order to obtain a large screen with the rear projection display device, either a projection distance needs to be extended or an angle of view of the projection lens needs to be widened. The former, however, has a problem that the cabinet is generally increased in size (in particular, in depth) and a larger setup space is needed. On the other hand, the latter has a problem that a larger number of lenses are needed to widen the angle of the projection lens, which increases the cost.

Further, because the projection device, the folding mirror, and the transmission screen are provided integrally in the cabinet, there is a problem that the transmission screen alone cannot be replaced with another transmission screen when such a need arises.

SUMMARY

An advantage of exemplary embodiments of the invention is that a projection display device can be configured as the user desires by making it possible to select one transmission screen from plural transmission screens.

The advantage of exemplary embodiments of the invention can be addressed as follows.

A projection display device according an exemplary aspect of the invention includes: plural transmission screens, each having an image display portion of different dimensions to which an image is displayed, and each having light transmissivity and being provided with a back surface layer having optical directivity on a back surface side; a projection device main body capable of projecting a projection light; an optical unit that guides the projection light from the projection device main body to the back surface of the transmission screen; and a supporting unit that supports one transmission screen selected from the plural transmission screens and the projection device main body. An image is displayed on the transmission screen by allowing the projection light guided by the optical unit to pass through from the back surface side. One transmission screen is selected from the plural transmission screens, and the selected transmission screen, the projection device main body, the optical unit, and the supporting unit are assembled for use.

By selecting the transmission screen to best suit the situation, it is possible to provide a projection display device that can be configured as the user desires.

Also, because each transmission screen has optical directivity, a screen having high contrast can be addressed by restricting lights that come incident on the transmission screen from a direction other than the direction of the projection light. Also, by using the transmission screen, the optical system can be in a state where it is exposed to extraneous lights without having to be accommodated in the cabinet. The entire device can be therefore reduced in size and weight.

It is preferable for the projection display device according to one exemplary aspect of the invention that plural kinds of optical units compatible with the respective transmission screens are provided, and one kind of optical unit is selected from the plural kinds of optical unit for assembly.

When configured in this manner, it is possible to provide a projection display device that can be configured as the user desires in a more reliable manner.

It is preferable for the projection display device according to one exemplary aspect of the invention that plural kinds of projection device main bodies compatible with the respective transmission screens are provided, and one kind of projection device main body is selected from the plural kinds of projection device main bodies for assembly.

When configured in this manner, it is possible to provide a projection display device that can be configured as the user desires in a further reliable manner.

It is preferable for the projection display device according to one exemplary aspect of the invention that the optical unit has a mirror, and a light reflected on the mirror is projected onto the transmission screen.

When configured in this manner, the configuration of the optical unit can be simpler.

It is preferable for the projection display device according to one exemplary aspect of the invention that the mirror is supported on the supporting unit.

When configured in this manner, the transmission screen, the projection device, and the mirror can be supported integrally.

It is preferable for the projection display device according to one exemplary aspect of the invention that a reflection surface of the mirror is a plane.

When configured in this manner, a highly accurate and inexpensive mirror can be readily obtained.

It is preferable for the projection display device according to one exemplary aspect of the invention that a reflection surface of the mirror is provided to be parallel or almost parallel to a vertical direction.

When configured in this manner, deformation of the mirror can be readily minimized.

It is preferable for the projection display device according to one exemplary aspect of the invention that at least part of the optical unit is provided to the projection device main body.

It is preferable for the projection display device according to one exemplary aspect of the invention that the optical unit is provided to the projection device main body, and that the optical unit has an optical system to allow a light to undergo refraction, and a projection light from the optical unit is projected onto the transmission screen.

When configured in this manner, the entire device can be readily reduced in size and weight.

It is preferable for the projection display device according to one exemplary aspect of the invention that the optical unit is provided to the projection device main body, and that the optical unit has a mirror, and a light reflected on the mirror is projected onto the transmission screen.

When configured in this manner, the entire device can be readily reduced in size and weight.

It is preferable for the projection display device according to one exemplary aspect of the invention that the optical unit is provided with a variable power mechanism that changes an angle of view of an image to be displayed on the transmission screen.

When configured in this manner, it is possible to obtain an optical unit compatible with plural transmission screens each having an image display portion of different dimensions to which an image is displayed, and plural kinds of projection devices.

It is preferable for the projection display device according to one exemplary aspect of the invention that the projection device main body is provided to tilt at a predetermined angle with respect to the transmission screen.

It is preferable for the projection display device according to one exemplary aspect of the invention that at least part of the projection device main body is provided on an extension of a surface of the image display portion of the transmission screen.

When configured in this manner, the entire device can be thinner, and a slim device can be therefore provided.

It is preferable for the projection display device according to one exemplary aspect of the invention that at least one of the plural transmission screens has flexibility, and that the projection display device further includes a screen adjusting unit that adjusts dimensions of the transmission screen having the flexibility.

When configured in this manner, the kinds of various derived parts can be fewer, which can in turn reduce the entire device in weight and save space and cost.

It is preferable for the projection display device according to one exemplary aspect of the invention that the supporting unit is shaped like a frame, so that when the transmission screen, the projection device main body, the optical unit, and the supporting unit are assembled, the transmission screen, the projection device main body, and the optical unit are exposed to an outside.

When configured in this manner, the entire device can save a space and can be reduced in size and weight.

It is preferable for the projection display device according to one exemplary aspect of the invention that the projection light is projected onto the selected transmission screen in a direction tilted by a predetermined angle, and the tilted direction and a direction along which the optical directivity of the transmission screen is set, agree or almost agree with each other.

When configured in this manner, the projection light from the projection device can be guided to the transmission screen in a reliable manner. In addition, because lights in any other direction can be shielded suitably, contrast of a projected image can be excellent.

It is preferable for the projection display device according to one exemplary aspect of the invention that the device further includes a front surface layer, formed on a light exiting-side of the back surface layer, on which strips of a light absorbing layer that absorbs a light from a predetermined direction are aligned in parallel spaced at predetermined intervals.

When configured in this manner, lights from the predetermined direction can be absorbed, and contrast of a projected image can be therefore excellent.

It is preferable for the projection display device according to one exemplary aspect of the invention that the device further includes a front surface layer formed on a light exiting-side of the back surface layer and provided with plural minute concaves and convexes on a display surface side.

When configured in this manner, contrast of a projected image can be excellent.

It is preferable for the projection display device according to one exemplary aspect of the invention that the device further includes a front surface layer provided on a light exiting-side of the back surface layer.

It is preferable for the projection display device according to one exemplary aspect of the invention that a light absorbing layer that absorbs lights is provided on convex portions of the concaves and convexes.

When configured in this manner, lights from the display surface side can be absorbed, and contrast on the display surface can be therefore excellent.

It is preferable for the projection display device according to one exemplary aspect of the invention that a light absorbing layer that absorbs lights is provided on inner side surfaces of the concaves and convexes.

When configured in this manner, lights can be absorbed in the inner side surfaces of the concaves and convexes in a reliable manner, and contrast on the display surface can be therefore excellent.

It is preferable for the projection display device according to one exemplary aspect of the invention that a light diffusing portion furnished with a light diffusing function is provided to the concave portions of the concaves and convexes.

When configured in this manner, lights can be diffused easily, which makes it possible to provide a projection display device equipped with a transmission screen having an excellent view angle property.

It is preferable for the projection display device according to one exemplary aspect of the invention that the concaves and convexes are formed by embossing.

When configured in this manner, minute concaves and convexes can be formed in the front surface layer easily in a reliable manner.

It is preferable for the projection display device according to one exemplary aspect of the invention that the device further includes an optical axis converting layer that changes a direction of an optical axis of the projection light that has passed through the back surface layer.

When configured in this manner, it is possible to provide a projection display device equipped with a transmission screen with excellent efficiency for light utilization.

It is preferable for the projection display device according to one exemplary aspect of the invention that the direction of the optical axis converted by the optical axis converting layer is almost perpendicular to the display surface.

When configured in this manner, it is possible to provide a projection display device equipped with a transmission screen with excellent efficiency for light utilization.

It is preferable for the projection display device according to one exemplary aspect of the invention that the optical axis converting layer is formed of a hologram.

When configured in this manner, the direction of the optical axis can be readily changed, which makes it possible to provide a projection display device equipped with a transmission screen with excellent efficiency for light utilization.

It is preferable for the projection display device according to one exemplary aspect of the invention that the back surface layer is formed of a micro louver.

When configured in this manner, a light projected in a direction tilted by a predetermined angle can be readily taken into the back surface layer in a reliable manner, which makes it possible to provide a projection display device equipped with a transmission screen with excellent efficiency for light utilization.

It is preferable for the projection display device according to one exemplary aspect of the invention that the optical axis converting layer is formed of a micro prism, a Fresnel lens, or a plural optical waveguides.

When configured in this manner, the direction of the optical axis can be readily changed, which makes it possible to provide a projection display device equipped with a transmission screen with excellent efficiency for light utilization.

It is preferable for the projection display device according to one exemplary aspect of the invention that the back surface layer and the optical axis converting layer are formed of plural optical waveguides disposed with inlets facing toward lights projected and with outlets facing toward the display surface.

When configured in this manner, the structure of the transmission screen can be simpler.

It is preferable for the projection display device according to one exemplary aspect of the invention that positions of tip ends of the plural optical waveguides are set irregularly to form a light diffusing portion furnished with a light diffusing function.

When configured in this manner, the structure of the transmission screen can be further simpler.

It is preferable for the projection display device according to one exemplary aspect of the invention that the device further includes a light diffusing portion furnished with a function of diffusing a light that has passed through the back surface layer.

When configured in this manner, it is possible to provide a projection display device equipped with a transmission screen having an excellent angle view property.

BRIEF DESCRIPTION OF THE DRAWINGS

Exemplary embodiments of the invention will be described with reference to the accompanying drawings, wherein like numbers reference like elements, and wherein:

FIG. 1 is a table showing six examples of the configuration of a projection display device of exemplary embodiments of the invention;

DETAILED DESCRIPTION OF EMBODIMENTS

First Exemplary Embodiment

Hereinafter, a projection display device of exemplary embodiments of the invention will be described in detail by way of preferred exemplary embodiments shown in the accompanying drawings. It should be appreciated, however, that exemplary embodiments of the invention are not limited to the exemplary embodiments below. Also, components described in the exemplary embodiments below include components replaceable or easily replaced by anyone skilled in the art or substantially identical components.

A projection display device of exemplary embodiments of the invention is a device adopting a method (rear method) by which an image is displayed by projecting lights onto the transmission screen from a direction (rear direction) opposite to the user (viewer).

Figure 2:
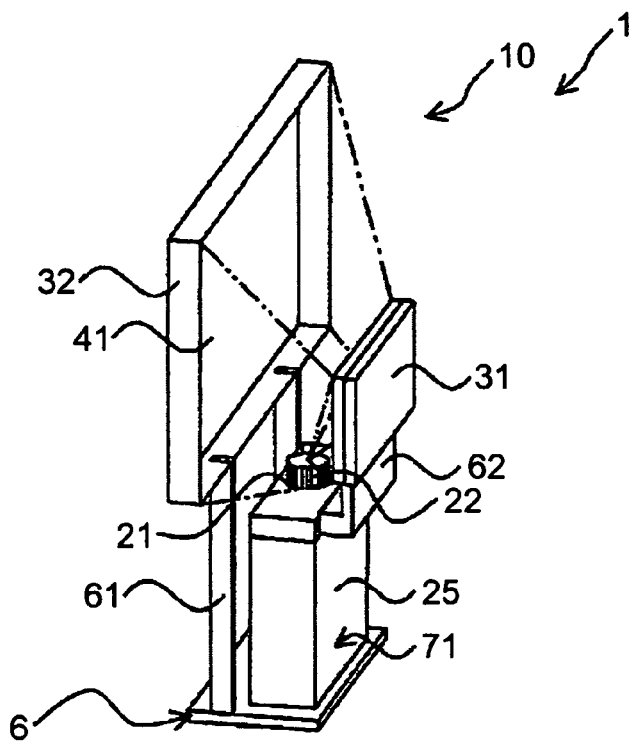
FIG. 2 is a schematic perspective view showing a configuration #1.
Figure 3:
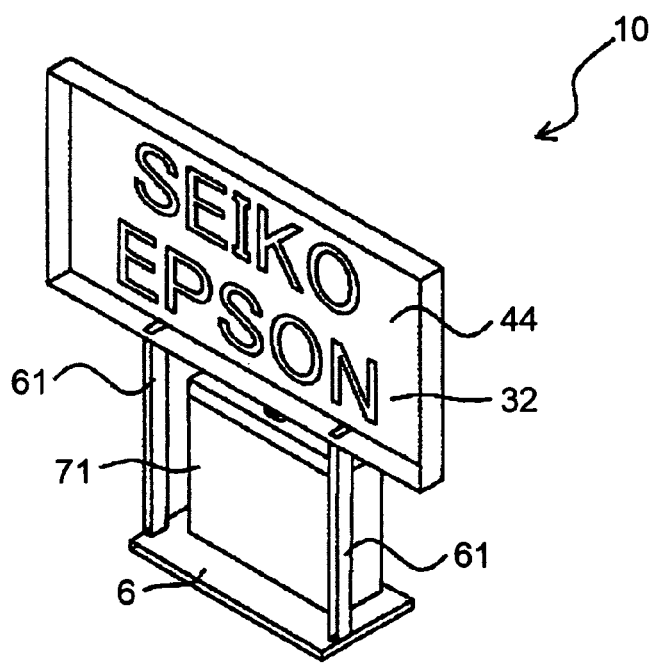
FIG. 3 is a schematic perspective view showing a unit in FIG. 2 in use.

FIG. 1 is a table showing six examples (examples of assembly) of the projection display device of exemplary embodiments of the invention. FIG. 2 is a schematic showing a configuration #1 of a unit in the projection display device of exemplary embodiments of the invention. FIG. 3 is a schematic showing the projection display device in FIG. 2 in use. Of these drawings, FIG. 2 and FIG. 3 are schematics showing conditions in use when projection lights are projected.

The projection display device 1 has: three screens (transmission screens) 32, 48, and 64 having, respectively, a 32-inch diagonal display region, a 48-inch diagonal display region, and a 64-inch diagonal display region as the sizes (dimensions) of a display surface (image display portion) to which an image can be displayed; a flexible screen 100; three mirrors 31, 33, 34 of different dimensions corresponding to the screens 32, 48, and 64 and the flexible screen 100; three projector main bodies (projection device main bodies) 25, 26, and 27 compatible with the screen 32, 48 and 64 and the flexible screen 100; a projection lens unit 22; a zoom lens unit (not shown); and frames (supporting units) 6 and 60.

The projection display device 1 of the first exemplary embodiment is used by assembling one screen selected from the screens 32, 48 and 64 and the flexible screen 100, one mirror selected from the mirrors 31, 33, and 34, one projector main body selected from the projector main bodies 25, 26, and 27, one lens unit selected from the projection lens unit 22 and the zoom lens unit, and one frame selected from the frames 6 and 60.

One lens unit selected from the projection lens unit 22 and the zoom lens unit and the projector main body 25 together constitute a projector (projection device) 71 of the first exemplary embodiment. One lens unit selected from the projection lens unit 22 and the zoom lens unit and the projector main body 26 together constitute a projector 72 of the first exemplary embodiment. One lens unit selected from the projection lens unit 22 and the zoom lens unit and the projector main body 27 together constitute a projector 73 of the first exemplary embodiment.

One screen selected from the screens 32, 48, and 64 and the flexible screen 100, one mirror selected from the mirrors 31, 33, and 34, one projector selected from the projectors 71, 72, and 73, and one frame selected from the frames 6 and 60 are assembled into one unit. The user selects, as needed, one of the screens 32, 48, and 64 and the flexible screen 100, one of the mirrors 31, 33, and 34, one of the projectors 71, 72, and 73, and one of the frames 6 and 60 to assemble a unit 10. The configurations #1 through #6 in FIG. 1 are examples of the configuration of the unit 10.

The configurations #1 through #6, together with the configurations of each screen (flexible screen), each optical unit, each projector, and each frame, will now be described.

<Configurations #1 Through #3>

FIG. 2 shows a state where the screen 32, the projector 71, the mirror 31, and the frame 6 are selected and assembled into the unit 10 (configuration #1 in FIG. 1).

It should be noted that the screen 32, the projector 71, and the mirror 31 are exposed to the outside in the assembled state.

The projection lens unit 22 includes a projection lens and a lens barrel supporting the projection lens.

The projector main bodies 25, 26 and 27 will now be described. Resolution is set higher in the projector main bodies 26 and 27 than in the projector main body 25. For example, the resolution of the projector main body 25 is 525 p (p indicates the progressive scanning that scans all the scan lines successively, which is superior to the interscan in terms of quality), whereas the resolution of the projector main bodies 26 and 27 is 750 p. In addition, luminance is set higher in the projector main body 27 than in the projector main bodies 25 and 26 (a light source emitting illumination lights of higher luminance is used). Because the configurations of these three projector main bodies are substantially the same in shape and function except for resolution and luminance, the projector main body 25 will be described as a representative example.

The projector main body 25 has an image display device in the interior, and projects projection lights of a display image by means of the image display device. The projection lens unit 22 is provided to the projector main body 25 at a light existing portion 21 of projection lights in a re-attachable manner. The projector main body 25 enlarges and projects projection lights by performing a keystone correction of a display image using the projection lens unit 22. The projector main body 25 is set to the frame 6 in a detachable/attachable manner (in a re-attachable manner).

A related art bayonet type mount can be used suitably as a mount (attaching portion) of the lens barrel of the projection lens unit 22. Alternatively, a type that can attach the projection lens unit 22 to the projector main body 25 to be rotatable about the optical axis, such as a screw type that taps the lens barrel of the projection lens unit 22, may be used. Further, an exclusive-use projection lens fastening device or linking device may be used.

The mirrors 31, 33, and 34 will now be described. Because these mirrors 31, 33, and 34 are substantially the same in shape and function except for the dimensions, the mirror 31 will be described as a representative example.

In the first exemplary embodiment, the mirror 31 is shaped like a plate, and has a plane (aspherical surface) on the reflection surface. The mirror 31 is attached (set) to a sub-frame 62 described below in a re-attachable manner, and it is attached to the latter stage of the light exiting portion 21 of the projector main body 25 to be almost parallel to the screen 32 (perpendicular or almost perpendicular to the setup surface). The mirror 31 reflects projection lights from the projector 71 (projector main body 25) (reflects both projection lights of the lower side and projection lights of the upper side of a display image), and guides them to the back surface side of the screen 32. A display image of a correct rectangular shape can be thereby projected onto the screen 32.

The projection lens unit 22 and the mirror 31 together constitute a major portion in the optical unit of the first exemplary embodiment.

The frame 6 includes main frames 61 and the sub-frame 62, and it is a base to mount one of the projectors 71, 72, and 73, one of the mirrors 31, 33, and 34, and one of the screens 32, 48, and 64 selected as needed. The main frames 61 have a supporting structure capable of holding the projector 71 in a re-attachable manner. The supporting structure of the main frames 61 includes, for example, (1) a structure to set the projector 71 by inserting it slidably into the main frames 61 having guiding portions, and (2) a structure to set the projector 71 by stopping it in the main frames 61 having stopping portions (not shown). The main frames 61 also have a supporting structure capable of holding the screen 32 in a re-attachable manner. The supporting structures for the projector 71 and the screen 32 can be selected arbitrarily within the scope obvious to anyone skilled in the art.

The main frames 61 have a re-attachable mounting stand 66. The mounting stand 66 is used to mount the projector, which is compatible with one of the screens 48 and 64 selected by the user to assemble the unit 10, onto the main frames 61. To be more specific, one of the projectors 72 and 73 is selected and mounted on the mounting stand 66. The mounting stand 66 has also a supporting structure capable of holding the projector 71 in a re-attachable manner. This supporting structure can be the same as the supporting structure of the main frames 61 used to hold the projector 71.

The sub-frame 62 has a supporting structure capable of holding the mirror 31 in a re-attachable manner. The sub-frame 62 is provided to the projector main body 25 in a re-attachable manner.

In the unit 10 according to the configuration #1, the projector 71 and the screen 32 are supported on the main frames 61 and the mirror 31 is supported on the sub-frame 62 in use (when projection lights are projected) (see FIG. 2). Projection lights from the projector 71 are reflected on the mirror 31 and guided to the back surface of the screen 32. The projection lights are thereby projected onto the screen 32 from the back surface side (see FIG. 2). A display image is displayed on the front surface of the screen 32 as the projection lights pass through the screen 32, which enables the user to watch a video (the same can be said for the units 10 according to the configuration #2 and the configuration #3).

The screens 32, 48, and 64 will now be described. Because these screens 32, 48, and 64 are substantially the same in shape and function except for the sizes of the display surface, the screen 32 will be described as a representative example.

Figure 4:
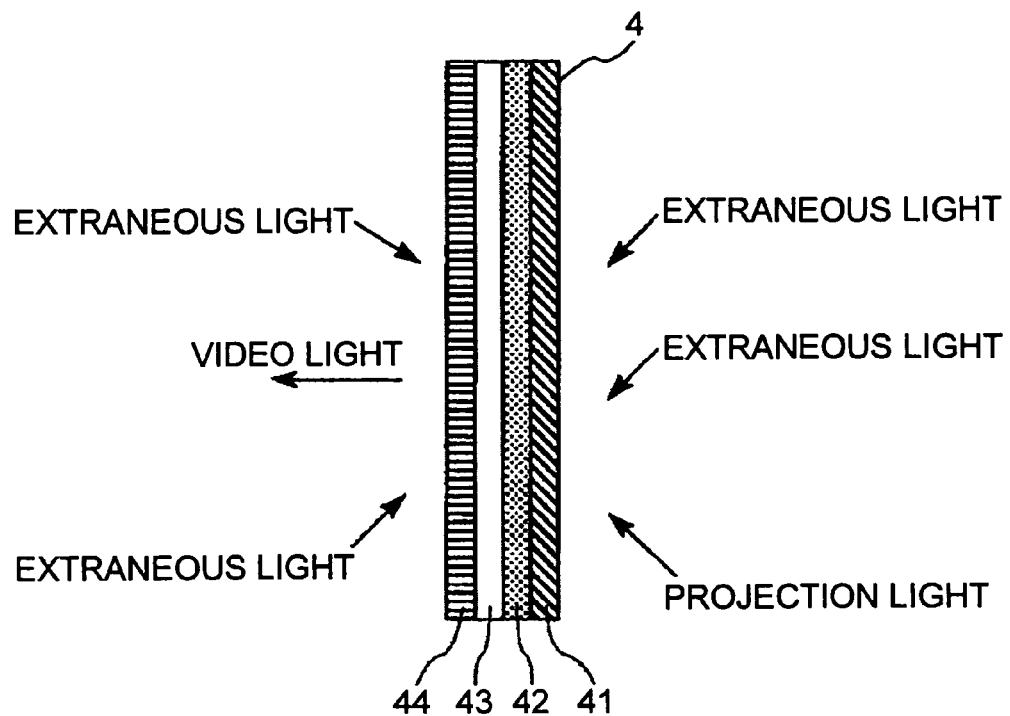
FIG. 4 is a schematic cross section showing a screen in the projection display device in FIG. 2.
Figure 5:
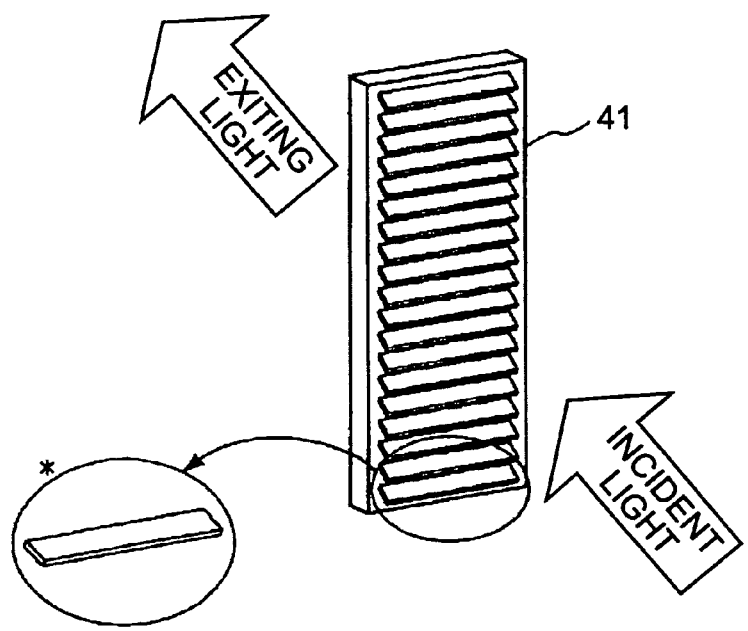
FIG. 5 is a schematic showing components forming the screen shown in FIG. 4.
Figure 6:
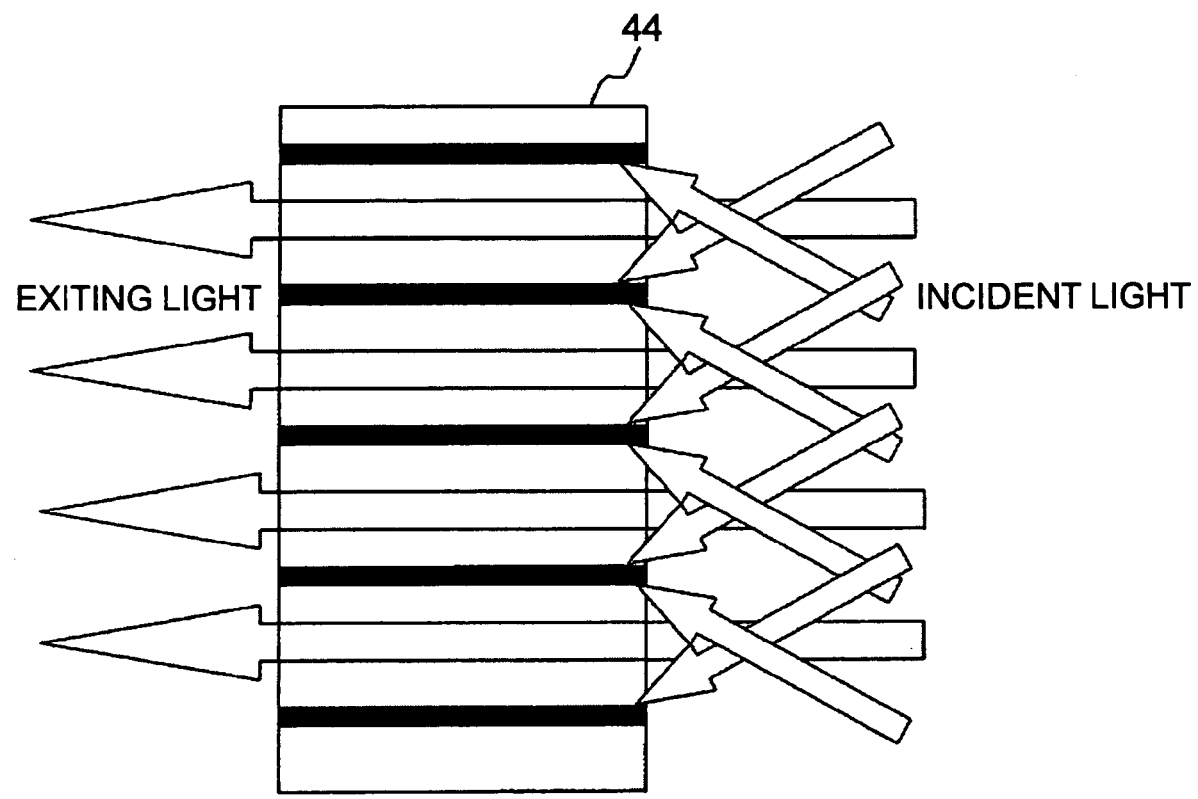
FIG. 6 is a schematic showing components forming the screen shown in FIG. 4.

FIG. 4 is a schematic showing the screen of the projection display device in FIG. 2. FIG. 5 and FIG. 6 are schematics showing components forming the screen shown in FIG. 4. Of these drawings, FIG. 5 shows the function of a back surface layer 41, and FIG. 6 shows the function of a front surface layer 44.

The screen 32 displays a display image on its surface by receiving projection lights from the projector 71. When projection lights are projected onto the screen 32, the screen 32 displays a display image by allowing projection lights projected from the back surface side to pass through (transmission screen). Hereinafter, the front surface of the screen 32 is the surface on the side where the user watches a display device, and the back surface side is the surface on the opposite side.

The screen 32 is formed by layering the back surface layer 41, an optical axis converting layer 42, a light diffusing layer 43, and the front surface layer 44 sequentially in this order. The screen 32, with a layer (the back surface layer 41) having optical directivity being disposed on the back surface, is characterized in that it transmits chiefly projection lights guided by the mirror 31 while eliminating other extraneous lights by reflection or absorption.

The back surface layer 41 includes a sheet-like member or a film-like member having optical directivity, and constitutes the back surface of the screen 32. Due to its optical directivity, the back surface layer 41 transmits chiefly lights that come incident at a particular angle of incidence while reflecting or absorbing lights that come incident at any other angle of incidence (see FIG. 4 and FIG. 5). The back surface layer 41 is set in such a manner that its optical directivity tilts by a predetermined angle with respect to the plane (ground surface).

It is preferable that an angle (direction) at which optical directivity of the back surface layer 41 is set and a projection direction (tilted direction) of projection lights from the projector 71 agree or almost agree with each other.

In the first exemplary embodiment, while the screen 32 is set to the frame 6, the back surface layer 41 is disposed with the direction in which its optical directivity is set heading toward the mirror 31. The back surface layer 41 is not particularly limited; however, for instance, a micro louver is used suitably.

The optical axis converting layer 42 includes a sheet-like or film-like member having an optical axis converting property, and is layered over the back surface layer 41 on the front surface side. Due to the optical axis converting property, the optical axis converting layer 42 converts the optical axes of incident lights (projection lights) to a particular direction. The optical axis converting layer 42 is not particularly limited; however, for instance, a hologram sheet, a micro prism, a micro fiber, and a Fresnel lens can be used suitably.

The light diffusing layer 43 includes a sheet-like or film-like member having a light diffusing property, and is layered over the back surface layer 41 on the front surface side. Due to the light diffusing property, the light diffusing layer 43 diffuses incident lights (projection lights). The light diffusing layer 43 is not particularly limited; however, for instance, a lenticular and a diffusing sheet can be used suitably.

The front surface layer 44 includes a sheet-like member or a film-like member having optical directivity, and is layered over the light diffusing layer 43 on the front surface side, thereby constituting the display surface of the screen 32. The front surface layer 44 is disposed in such a manner that a direction in which its optical directivity is set is perpendicular or almost perpendicular to the display surface of the screen 32 (see FIG. 4 and FIG. 6). The front surface layer 44 is furnished with a function of absorbing extraneous lights. Reflection of extraneous lights on the display surface of the screen 32 is thereby suppressed, which makes it easier for the user to watch a display image. The front surface layer 44 is not particularly limited; however, for instance, a micro louver can be used suitably. Alternatively, the front surface layer 44 may be a planar absorbing layer referred to as a black stripe.

When projection lights are projected onto the screen 32, projection lights are guided by the mirror 31 and go incident on the back surface layer 41 from the back surface side (see FIG. 4). In this instance, lights (extraneous lights) other than lights that come incident at a particular angle (chiefly projection lights) are reflected on or absorbed in the back surface layer 41. The projection lights then pass through the back surface layer 41 and go incident on the optical axis converting layer 42. The optical axes of projection lights are converted to a direction perpendicular or almost perpendicular to the plane of the screen 32 in the optical axis converting layer 42. The projection lights then go incident on the light diffusing layer 43 to be diffused. Thereafter, lights following the directivity of the front surface layer 44 pass through the front surface layer 44, and exit toward the front surface of the screen 32. A display image is thus formed on the screen 32.

Figure 7:
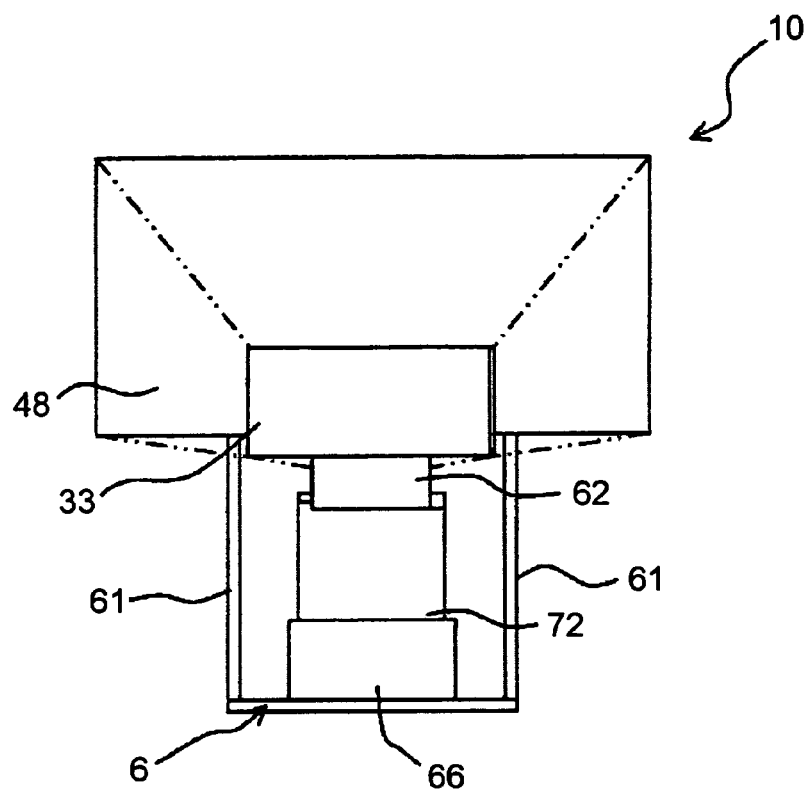
FIG. 7 is a schematic showing a configuration #2.
Figure 8:
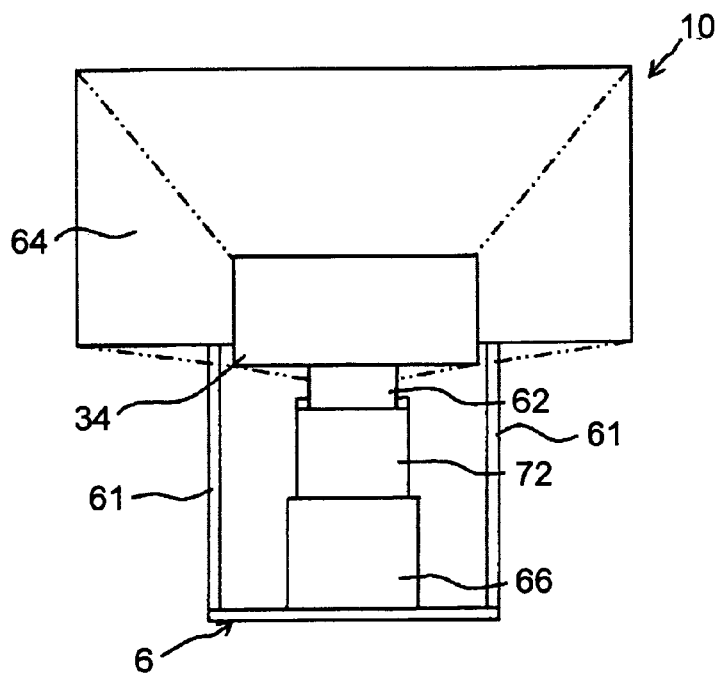
FIG. 8 is a schematic showing a configuration #3.

The units 10 according to the configuration #2 and the configuration #3 will now be described. FIG. 7 is a schematic showing the configuration #2. FIG. 8 is a schematic showing the configuration #3. Hereinafter, for ease of explanation, the upper side of FIG. 7 is referred to as "top", the lower side as "bottom", the left side as "left", and the right side as "right". Also, a distance from top to bottom of FIG. 7 is refereed to as "length" and a distance from left to right as "width".

The units 10 according to the configuration #2 and the configuration #3 are other examples of the unit 10 according to the configuration #1, and the screens and the projectors are different from their counterparts in the configuration #1.

As is shown in FIG. 7, the unit 10 according to the configuration #2 has the screen 48, the mirror 33, the projector 72, and the frame 6, which are assembled for use. Likewise, as is shown in FIG. 8, the unit 10 according to the configuration #3 has the screen 64, the mirror 34, the projector 72, and the frame 6, which are assembled for use.

As has been described, according to the projection display device 1, it is possible to provide a projection display device having a higher degree of flexibility (a tailor-made device) by allowing the user to select specifications (the size of the screen, an angle of view of an image to be displayed on the screen, resolution, etc.) to suit the situations and by assembling corresponding components into a desired unit.

In addition, by using a simple plane mirror as the reflection surface of the mirror 31, which is the closest to the screen in terms of optical characteristics, it is possible to manufacture the mirror 31 with accuracy at a low cost. It is thus possible to provide the projection display device 1 with a high image quality at a low cost.

In addition, by supporting the mirror 31 to be perpendicular or almost perpendicular to the setup surface, gravity-induced deformation of the mirror 31 can be minimized even when the mirror 31 has a poor strength (for example, when the mirror 31 comprises a minimal structural material to have a light weight). It is therefore possible to provide the projection display device 1 at a low cost.

Because each of the screens 32, 48, and 64, the mirrors 31, 33, and 34, and the projectors 71, 71, and 72 is configured to be re-attachable to the frame 6, these components can be disassembled and transported separately, for example, at the time of transportation. This makes transportation of the unit 10 easier.

Because the screen 32 has the back surface layer 41 having optical directivity, and the back surface layer 41 transmits projection lights from the mirror 31 while reflecting or absorbing extraneous lights in use, the contrast of a display image can be enhanced. This eliminates the need for a cabinet used in the projection display device in the related art. The entire projection display device 1 can be therefore reduced further in size and weight, and the unit 10 can be readily set in a narrow space.

As has been described, the projection display device 1 has many advantages in that the device can be lighter, more compact, thinner, smarter, and installed more readily, and that environmental burdens can be reduced. In addition, because cooling efficiency of the device can be enhanced by omitting the cabinet, the heat-releasing mechanism and the cooling structure (for example, a cooling fan or a heat sink) can be simpler.

In the first exemplary embodiment, the projector 71 is set perpendicularly to the setup surface to project projection lights upward, so that projection lights are bent (by reflection) at an obtuse angle (at 90° or greater) on the mirror 31 to be projected onto the back surface of the screen 32. However, the posture to set the projector 71 is not limited to this posture. For example, the projector 71 may be set parallel to the setup surface. In this case, for example, projection lights that exit in a direction parallel to the setup surface are bent (by reflection) at an acute angle (at 90° or smaller) on the mirror 31 to be projected onto the screen 32. In the former case, a display device adopting rear projection yet almost as thin as a normal flat panel display (plasma display, a direct-view liquid crystal display, etc.) can be addressed and/or achieved.

<Configuration #4 and Configuration #5>

The configurations #4 and #5 will now be described.

Hereinafter, the units 10 according to the configurations #4 and #5 will be described by focusing differences from the configurations #1 through #3, and descriptions of the same components and functions are omitted herein.

Both of the units 10 according to the configurations #4 and #5 have optical units different from the counterparts in the configurations #1 through #3.

The unit 10 according to the configuration #4 has the screen 48, the projector main body 26, the mirror 33, the zoom lens unit, and the frame 6, which are selected and assembled into a unit.

The optical unit specified by the configuration #4 has the mirror 33 and the zoom lens unit corresponding to all the screen sizes from the screen size of the screen 32 to the screen size of the screen 48. The zoom lens unit is provided to change an angle of view of an image to be displayed on the screen 32, and is provided with plural lenses (a lens group), a lens barrel supporting these plural lenses, and a mechanism having a section that drives these plural lenses, that is, a zoom mechanism (variable power mechanism). The zoom lens unit changes an angle of view by changing a focal length by driving (moving) part of the lens system (lens group), while maintaining a constant focal position (performing focusing) by driving another part of lens system (lens group).

The unit 10 according to the configuration #5 has the screen 64, the projector main body 27, the mirror 34, the zoom lens unit, and the frame 6, which are selected and assembled into a unit.

The optical unit specified by the configuration #5 has the mirror 34 and the zoom lens unit corresponding to all the screen sizes from the screen size of the screen 48 to the screen size of the screen 64.

Because the zoom lens unit in the optical unit specified by the configuration #5 is substantially the same as the zoom lens unit in the optical unit specified by the configuration #4 in configuration and function except for the screen sizes they can correspond to, descriptions of this zoom lens are omitted herein.

The units 10 according to the configuration #4 and the configuration #5 can address the same advantages as those of the units 10 according to the configurations #1 through #3.

These units 10 have no need to change the projector main bodies 25, 26, and 27 and the optical unit when the screen size is changed, which can save time and manpower needed for assembly (re-assembly). Also, by using the optical unit commonly, the kinds of derived parts can be fewer. In addition, for example, because the optical unit in the configuration #4 is compatible with any screen as long as the screen is of a size from 32 to 48 inches diagonally, the optical unit is highly versatile. Likewise, for example, because the optical unit according to the configuration #5 is compatible with any screen as long as the screen is of a size from 48 to 64 inches diagonally, the optical unit is highly versatile.

A driving source to drive the zoom lens unit can be provided either at the end of the zoom lens unit or at the end of the projector main body. Alternatively, the zoom lens unit may be driven by a manual mechanism.

<Configuration #6>

The configuration #6 will now be described.

Figure 9:
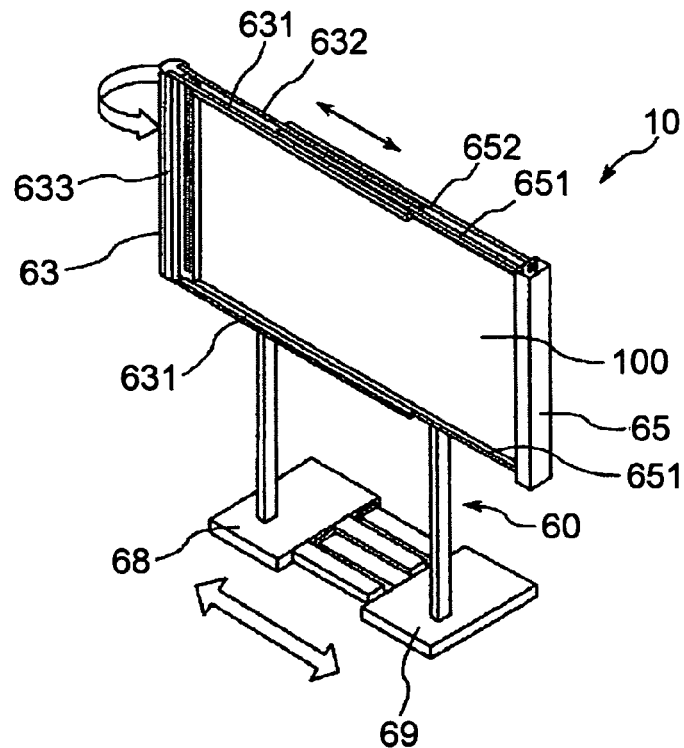
FIG. 9 is a schematic showing a configuration #6.

FIG. 9 is a schematic showing the configuration #6.

Hereinafter, the unit 10 according to the configuration #6 will be described by focusing differences from the unit 10 according to the configuration #5, and descriptions of the same components and functions are omitted herein. For the configuration #6, the optical unit, the projector main body, part of the portion supporting the projector main body and the like are omitted from the drawing.

The unit 10 according to the configuration #6 has a screen and a frame different from the counterparts in the configuration #5.

As is shown in FIG. 9, the unit 10 according to the configuration #6 can address a screen whose size in the width direction is variable (adjustable) by allowing the frame 60 to extend and contract.

The screen of the unit 10 according to the configuration #6 includes the flexible screen 100 having flexibility. The flexible screen 100 can change its size in the width direction of the screen to correspond to any screen of a size from 64 to 48 inches diagonally. The flexible screen 100 is fixed to the core (not shown) provided in an accommodation portion 633 at one end, and is wound up when accommodated in the accommodation portion 633. The flexible screen 100 can be developed when pulled out from the accommodation portion 633, and it is developed during assembly.

Because the function of the flexible screen 100 is almost the same as those of the screens 32, 48, and 64, descriptions of this function are omitted herein.

The frame 60 has legs 68 and 69, and screen frames 63 and 65.

The legs 68 and 69 are provided with an unillustrated moving mechanism, such as rollers, on the ground contact surfaces, and they are provided in such a manner that one is allowed to move with respect to the other.

The screen frame 63 is affixed to the upper side of the leg 68. The screen frame 63 has two pairs of rod-like engaging portion 631 and engaging portion 632. In each pair, the engaging portion 631 and the engaging portion 632 are spaced apart by a predetermined distance and provided in parallel with each other. Also, one pair of the engaging portions 631 and 632 and the other pair of the engaging portions 631 and 632 are spaced apart by a predetermined distance and provided in parallel with each other.

The screen frame 65 is affixed to the upper side of the leg 69. The screen frame 65 has two pairs of rod-like engaging portion 651 and engaging portion 652. In each pair, the engaging portion 651 and the engaging portion 652 are spaced apart by a predetermined distance and provided in parallel with each other. Also, one pair of the engaging portions 651 and 652 and the other pair of the engaging portions 651 and 652 are spaced apart by a predetermined distance and provided in parallel with each other.

The screen frame 63 and the screen frame 65 are provided in such a manner that one is allowed to move with respect to the other in the width direction of the flexible screen 100. The screen frames 63 and 65 engage with each other as the engaging portion 651 is sandwiched between the engaging portion 631 and the engaging portion 632 in each pair, and the engaging portion 632 is sandwiched between the engaging portion 651 and the engaging portion 652 in each pair. These engaging portions 631, 632, 651, and 652 allow one of the screen frames 63 and 65 to guide the other when the screen frames 63 and 65 move. In addition, these engaging portions 631, 632, 651, and 652 allow one of the screen frames 63 and 65 to prohibit the other from moving in the thickness direction of the flexible screen 100.

The accommodation portion 633 is provided to the screen frame 63 in a re-attachable manner at the end portion of the screen frame 63 on the left side in FIG. 9.

The other end portion of the flexible screen 100 is provided to the screen frame 65 in a re-attachable manner.

The flexible screen 100 can be thus attached to/detached from the frame 60 together with the accommodation portion 633.

The legs 68 and 69 and the screen frames 63 and 65 of the frame 60 together constitute a major portion of a screen adjusting unit of the first exemplary embodiment.

Operations (function) to change the size of the flexible screen 100 in the width direction will now be described.

In a case where the size of the flexible screen 100 in the width direction is changed from a size corresponding to the 64-inch screen to a size corresponding to the 48-inch screen, part of the flexible screen 100 is wound up and accommodated in the accommodation portion 633. In this instance, the flexible screen 100 is wound up as the user moves the screen frames 63 and 65 in a direction to bring them in close proximity to each other. The flexible screen 100 thus wound up is accommodated in the accommodation portion 633.

In a case where the size of the flexible screen 100 in the width direction is changed from a size corresponding to the 48-inch screen to a size corresponding to the 64-inch screen, part of the flexible screen 100 is developed by being pulled out from the accommodation portion 633. In this instance, the flexible screen 100 is developed from the accommodation portion 633 as the user moves the screen frames 63 and 65 in a direction to be spaced apart from each other (a direction indicated by an arrow in the drawing).

By accommodating and developing the flexible screen 100 in this manner, it is possible to change the size of the flexible screen 100 in the width direction to any size as the user desires.

When the size of the flexible screen 100 is changed, the projector 71 is detached from the frame 60 before the operations and the projector 71 is re-attached to the frame 60 after the operations.

As has been described, the unit 10 according to the configuration #6 can address the same advantages as those of the unit 10 according to the configuration #5.

By using the frame 60 and the flexible screen 100, the unit 10 is able to display images of different sizes using a single screen, which can in turn reduce the kinds of derived parts.

A confirming unit that confirms the specified sizes of the screen (for example, 64 inches, 48 inches, etc.) may be provided additionally. Also, it is preferable to provide a structure such that allows a convex portion provided to one of the legs 68 and 69 to fit in a concave portion provided to the other. In this case, the size of the flexible screen 100 can be fixed by fitting the convex portion into the concave portion after the confirming unit confirmed that the flexible screen 100 reached the specified size. This ensures the screen 100 to stay in the specified size. Alternatively, it may be configured in such a manner that the flexible screen 100 can be fixed to any size as the user desires besides the specified sizes.

In the first exemplary embodiment, the size of the flexible screen 100 is adjusted by winding up the flexible screen 100; however, exemplary embodiments of the invention are not limited to this configuration. The size of the flexible screen 100 may be adjusted by folding the flexible screen 100.

Also, the first exemplary embodiment described an example where the screen size in the width direction is made variable by winding up the flexible screen 100 in the width direction; however, exemplary embodiments of the invention are not limited to this configuration. It may be configured in such a manner that the screen size is made variable in the length direction by winding up the flexible screen 100 in the length direction, or the screen size is made variable by winding the flexible screen 100 in both the width and length directions.

In the first exemplary embodiment, the flexible screen 100 is accommodated and developed manually; however, exemplary embodiments of the invention are not limited to this configuration. It may be configured in such a manner that the unit 10 has a moving unit that automatically accommodates and develops the flexible screen 100.

It goes without saying that the size of the flexible screen in the projection display device of exemplary embodiments of the invention is not limited to the sizes specified as above.

Hereinafter, other exemplary embodiments of the projection display device of exemplary embodiments of the invention will be described.

Second Exemplary Embodiment

Figure 10:
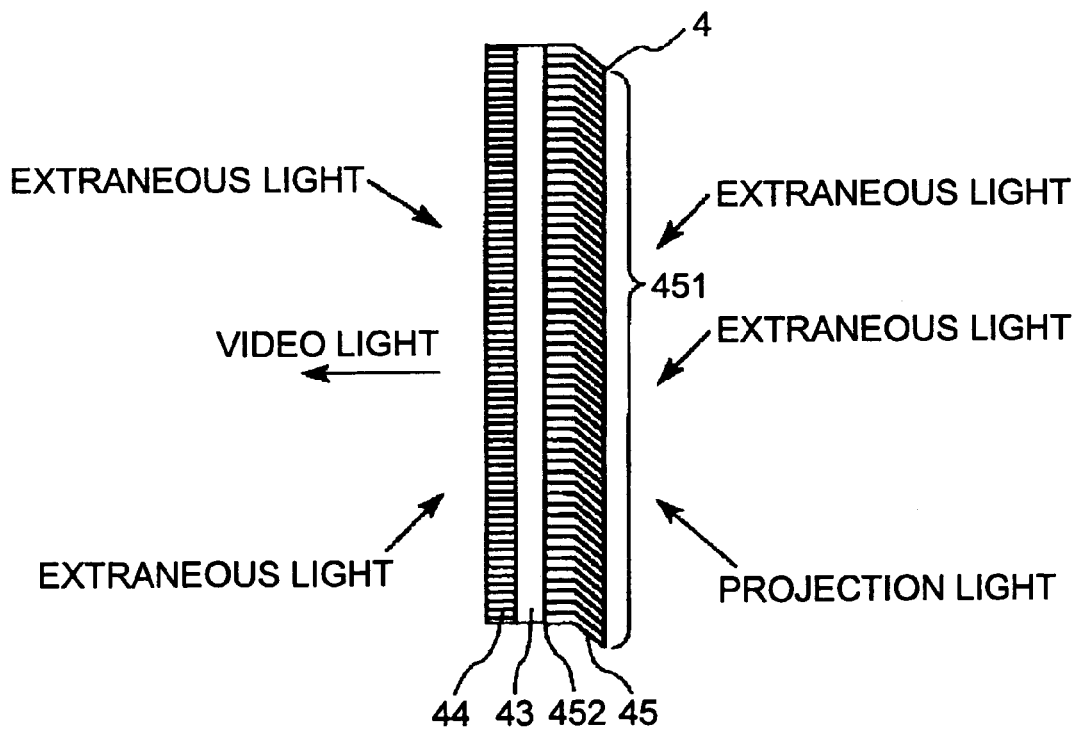
FIG. 10 is a schematic showing a second exemplary embodiment of the projection display device of the invention.
Figure 11:
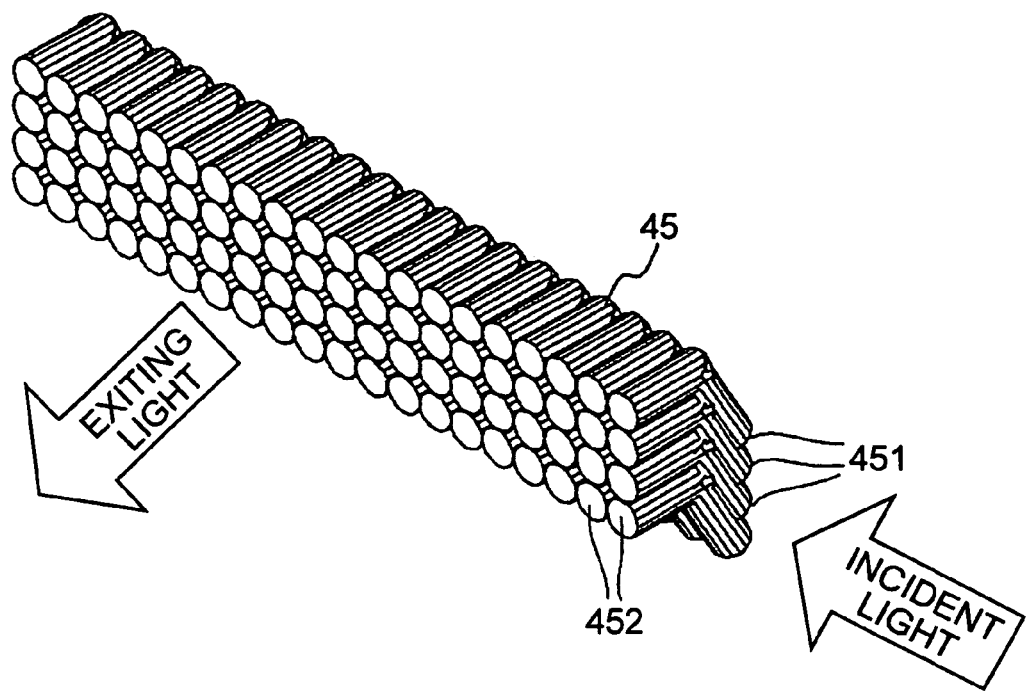
FIG. 11 is a schematic showing a major portion of a screen shown in FIG. 10.
Figure 12:
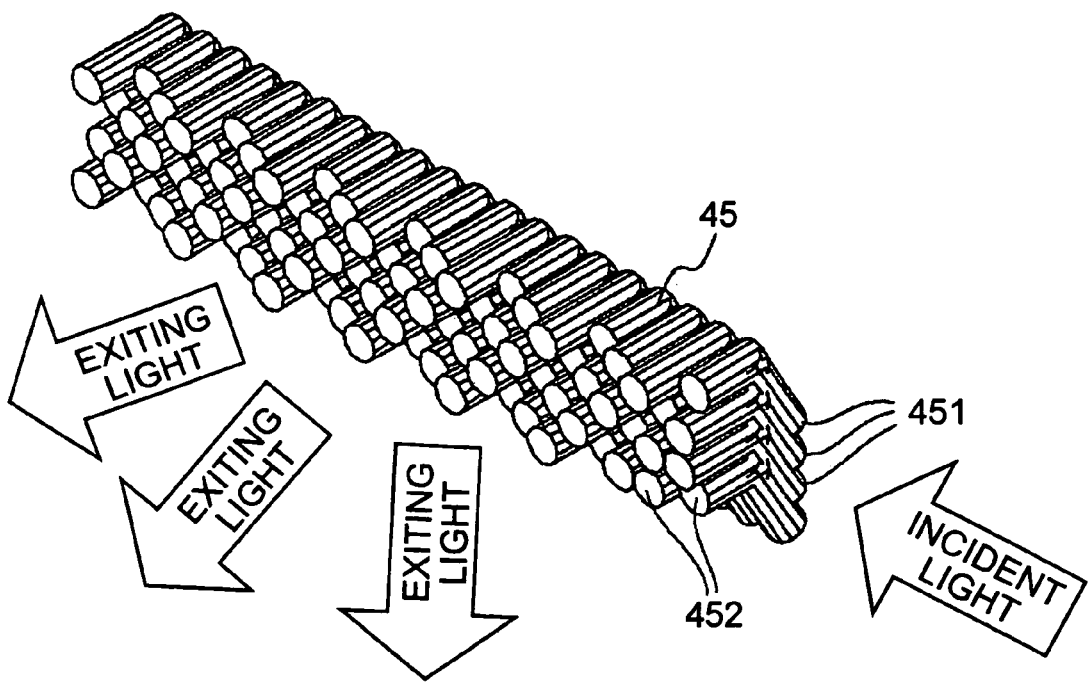
FIG. 12 is a schematic showing the major portion of the screen shown in FIG. 10.

FIG. 10 is a cross section showing a second exemplary embodiment of the projection display device of the invention. FIG. 11 and FIG. 12 are schematics showing a major portion of the screen shown in FIG. 10.

Hereinafter, the projection display device 1 of the second exemplary embodiment will be described by focusing differences from the first exemplary embodiment, and descriptions of the same components and functions are omitted herein.

Screens 32, 48 and 64 in the second exemplary embodiment will now be described. However, because these screens 32, 48, and 64 are substantially the same in shape and function except for the sizes of the display surface, the screen 32 will be described as a representative example.

The screen 32 is characterized in that the back surface layer 41 and the optical axis converting layer 42 include a single optical waveguide 45. That is, the screen 32 is formed by layering the optical waveguide 45, the light diffusing layer 43, and the front surface layer 44 sequentially in this order.

The optical waveguide 45 is a member to guide lights that come incident from inlets 451 to exit from outlets 452, and has optical directivity and the optical axis converting property. To be more specific, the optical waveguide 45 takes in lights that come incident in a particular direction (projection lights) alone from the inlets 451, and guides these lights to exit from the outlets 452 in a predetermined direction. The optical waveguide 45 constitutes the back surface of the screen 32, and is set with an opening direction of the inlets 451 heading toward the mirror 31 (see FIG. 10 and FIG. 11). The optical waveguide 45 is curved or bent in the middle, and is disposed with the outlets 452 being perpendicular to the plane of the light diffusing layer 43. The optical waveguide 45 is formed, for example, by binding plural bent or curved optical fibers.

When projection lights are projected onto the screen 32, projection lights are guided from the back surface side by the mirror 31 to go incident and travel through the optical waveguide 45 (see FIG. 10). In this instance, projection lights that come incident at a particular angle alone are guided to travel through the optical waveguide 45 from the inlets 451, while the other lights (extraneous lights) are reflected or absorbed at the inlets 451. The projection lights thus travel through the optical waveguide 45 by repeating total reflection and are emitted from the outlets 452 toward the light diffusing layer 43. The projection lights are then diffused by the light diffusing layer 43 and go incident on the front surface layer 44. A display image is thus formed on the screen 32.

According to the screen 32, because the back surface layer 41 and the optical axis converting layer 42 include the single optical waveguide 45, the configuration of the screen 32 can be simpler.

When the optical waveguide 45 is formed by binding plural optical fibers (see FIG. 10 and FIG. 11), it is preferable for the screen 32 to fill spaces among optical fibers with a light absorbent (not shown). Extraneous lights other than the projection lights are thus shielded effectively on the back surface side (optical waveguide 45) of the screen 32, which can in turn further enhance the contrast of a display image.

In the screen 32, the optical waveguide 45 is configured in such a manner that the positions of the outlets 452 are aligned neatly (see FIG. 10 and FIG. 11); however, exemplary embodiments of the invention are not limited to this configuration. The optical waveguide 45 may be configured in such a manner that the positions of the outlets 452 are aligned in a staggered arrangement (see FIG. 12). For example, the optical waveguide 45 shown in FIG. 12 is configured in such a manner that the aligning surfaces of the outlets 452 are aligned irregularly in three rows. When configured in this manner, projection lights are diffused in the vicinity of the outlets 452 of the optical waveguide 45. Hence, a configuration such that can make the light scattering layer 43 thinner, or a configuration such that can omit the light diffusing layer 43 (for example, a configuration in which the screen 32 is formed by layering the optical waveguide 45 shown in FIG. 12 and the front surface layer 44) can be addressed (not shown).

The second exemplary embodiment can be applied to each of the other exemplary embodiments.

Third Exemplary Embodiment

Figure 13:
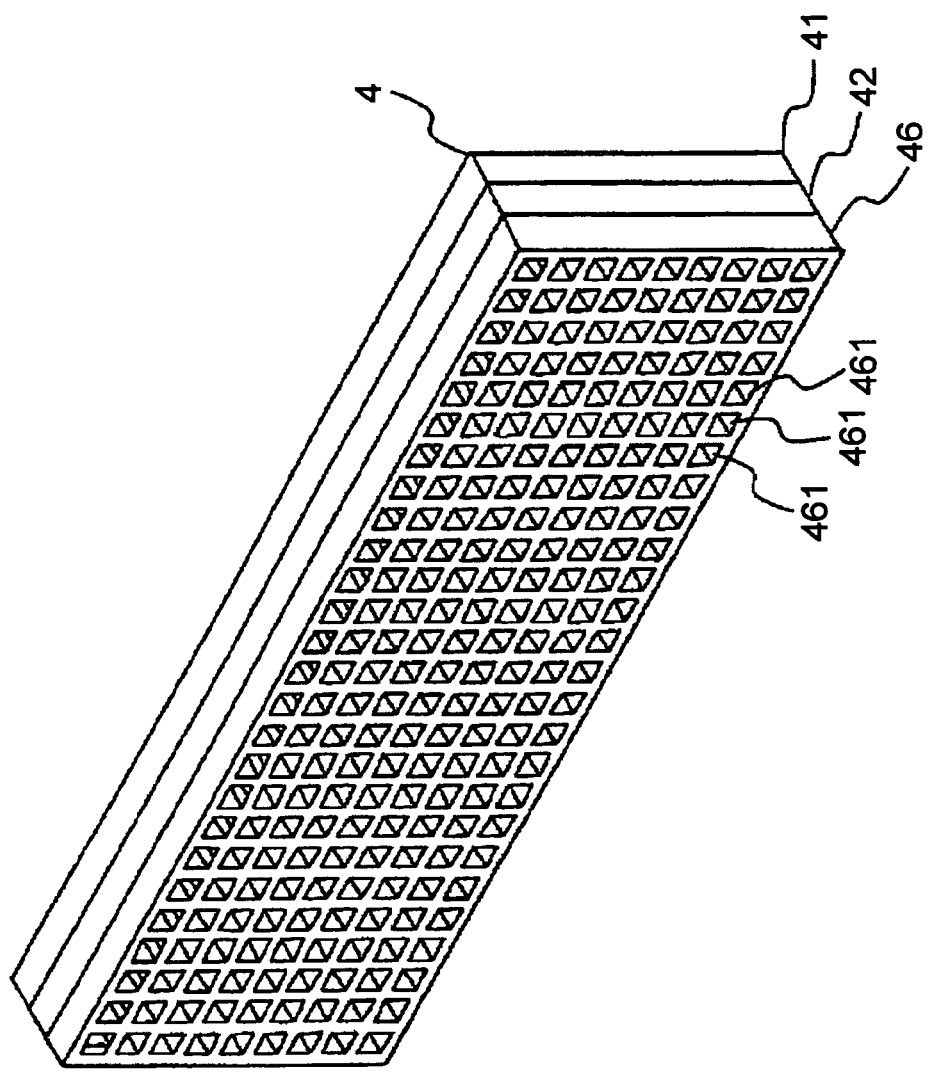
FIG. 13 is a schematic showing a third exemplary embodiment of the projection display device of the invention.
Figure 14:
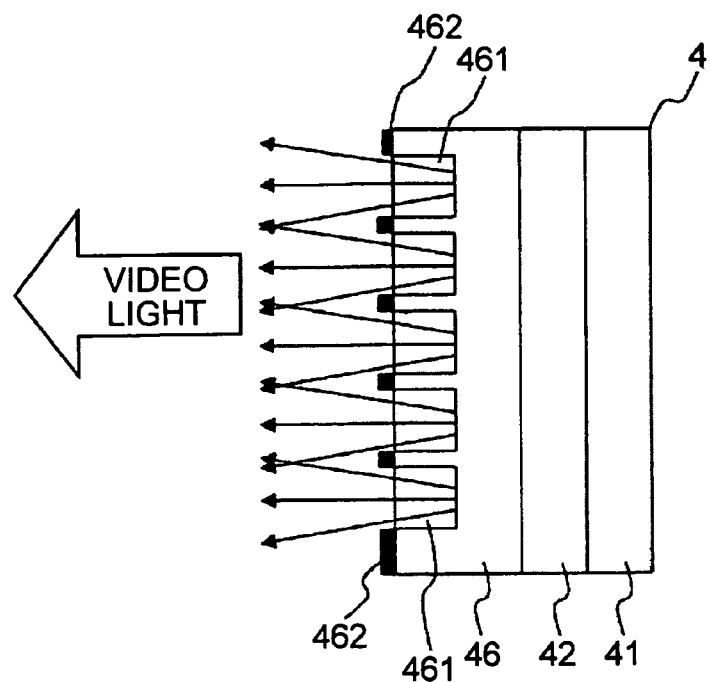
FIG. 14 is a schematic showing the third exemplary embodiment of the projection display device of the invention.
Figure 15:
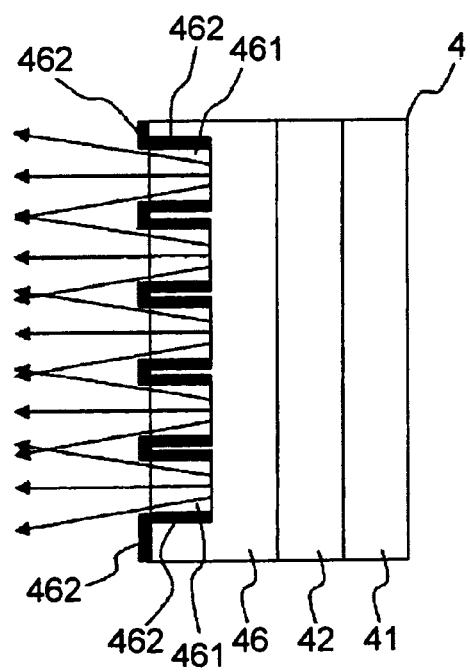
FIG. 15 is a schematic showing the third exemplary embodiment of the projection display device of the invention.
Figure 16:
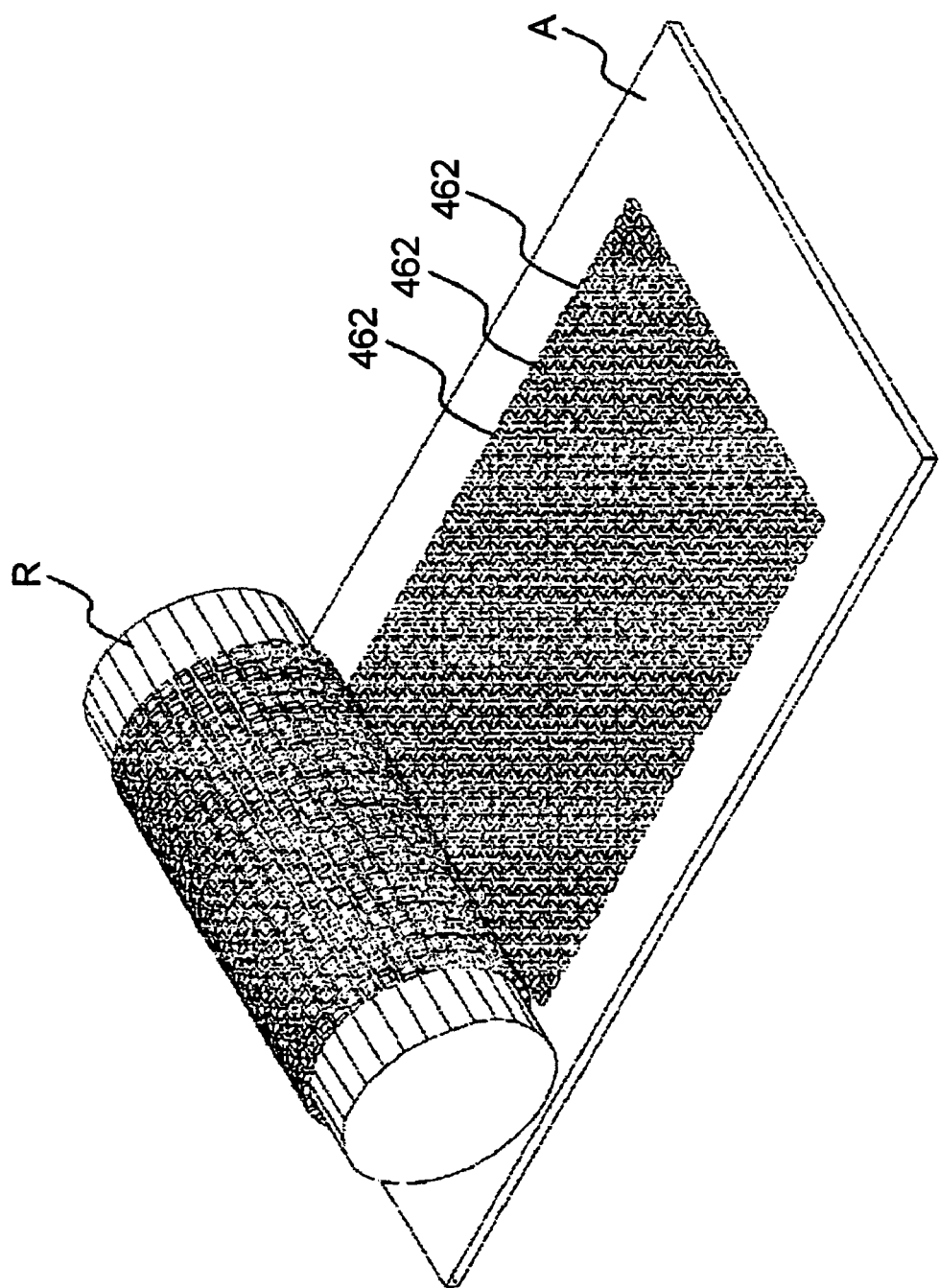
FIG. 16 is a schematic showing a manufacturing process of a screen in FIG. 13-FIG. 15.

FIG. 13 through FIG. 15 are schematics showing a third exemplary embodiment of the projection display device of the invention. FIG. 16 is a schematic describing a manufacturing process of the screen shown in FIG. 13 through FIG. 15.

Hereinafter, the projection display device 1 of the third exemplary embodiment will be described by focusing differences from the first exemplary embodiment, and descriptions of the same components and functions are omitted herein.

Screens 32, 48 and 64 of the third exemplary embodiment will now be described. However, because these screens 32, 48 and 64 are substantially the same in shape and function except for the sizes of the display surface, the screen 32 will be described as a representative example.

The screen 32 is characterized in that the light diffusing layer 43 and the front surface layer 44 comprise a single embossed layer 46. That is to say, the screen 32 is formed by layering the back surface layer 41, the optical axis converting layer 42, and the embossed layer 46.

The embossed layer 46 is provided with plural minute concave-convex portions 461 (light exiting pits) having an emboss shape on the front surface (see FIG. 13 through FIG. 15). Black stripes 462 are formed on respective convex surfaces (the convex surfaces of the concave-convex portions 461) on the embossed layer 46. In the embossed layer 46, the bottom surfaces of the concave-convex portions 461 (the bottom surfaces of the concave portions) are furnished with a light diffusing function, and the black stripes 462 function to absorb lights. The black stripes 462 are formed by coloring the surface of the embossed layer 46 in black by printing or the like.

When projection lights are projected onto the screen 32, projection lights from the projector 71 go incident on the back surface layer 41, and further go incident on the embossed layer 46 from the back surface side via the optical axis converting layer 42. The projection lights are then diffused by the bottom surfaces of the concave-convex portions 461 and emitted forward from the emitting pits (concave spaces in the concave-convex portions 461) (see FIG. 14). A display image is thus formed on the screen 32. Meanwhile, extraneous lights that come incident on the screen 32 from the front surface are absorbed in the black stripes 462 on the embossed layer 46. Reflection of extraneous lights on the front surface of the screen 32 can be thereby suppressed, which not only makes it easier for the user to watch a display image, but also enhances the contrast.

According to the screen 32, because the light diffusing layer 43 and the front surface layer 44 include the single embossed layer 46, the configuration of the screen 32 can be simpler.

In the screen 32, the black stripes 462 are formed on the convex surfaces of the embossed layer 46 alone; however, exemplary embodiments of the invention are not limited to this configuration. The black stripes 462 may be formed on both the convex surfaces and the inner side surfaces (the inner side surfaces of the concave portions excluding the bottom surfaces of the concave portions) of the concave-convex portions 461 (see FIG. 14). Reflection of extraneous lights on the front surface of the screen 32 can be thereby suppressed more efficiently, which can in turn make it further easier for the user to watch a display image.

In the screen 32, the embossed layer 46 is made of a planar resin material A provided with plural concave-convex portions 461. To be more specific, the concave-convex portions 461 in the embossed layer 46 are formed by rolling a roll stamper R having embossing dies over the planar resin material A at a predetermined pressure (see FIG. 16). When configured in this manner (by the screen manufacturing method), a number of concave-convex portions 461 can be readily formed.

The third exemplary embodiment can be applied to each of the other exemplary embodiments.

Fourth Exemplary Embodiment

Hereinafter, the projection display device 1 of a fourth exemplary embodiment will be descried by focusing differences from the first exemplary embodiment, and descriptions of the same components and functions are omitted herein.

The unit 10 of the first exemplary embodiment is provided with a single mirror 31 alone (see FIG. 2 and FIG. 3). When configured in this manner, when projection lights are projected, projection lights from the projector 71 are inversed first by the mirror 31, and then a display image is formed on the screen 32 from the back surface side. A display image that is unreversed left to right can be thus displayed on the screen 32.

Exemplary embodiments of the invention, however, are not limited to this configuration, and more than one mirror 31 may be provided. For example, when an odd number of mirrors 31 are provided, a display image that is unreversed left to right can be displayed on the screen 32 as is with the case of providing a single mirror 31. Alternatively, an even number of mirrors 31 may be provided to best suit the purpose of use. The scanning direction of an image is controlled by the image display device in the projector 71 to adjust an image to be reversed or unreversed left to right. Alternatively, display data may be controlled by a command from a display controller or the like for such an adjustment. A display image can be thereby adjusted to be unreversed left to right. The fourth exemplary embodiment can be applied to each of the other exemplary embodiments.

Fifth Exemplary Embodiment

Hereinafter, the projection display device 1 of a fifth exemplary embodiment will be described by focusing differences from the first exemplary embodiment, and descriptions of the same components and functions are omitted herein.

The units 10 according to the configurations #1 through #3 have only one projection lens (single-lens method) (not shown). When configured in this manner, projection lights of three primary colors are combined at the stage when they go incident on the projection lens. In the single lens method, projection lights are therefore projected on the screen 32, 48 or 64 (descriptions will be given using the screen 32 as a representative example) by traveling through a common optical path after the exit from the projection lens. Hence, even when a projection distance to the screen 32 is changed, images of three primary colors will not be projected in misalignment.

The related art includes a configuration (triple-lens method) in which a separate projection lens is provided for each primary color to combine the projection lights on the screen. When configured in this manner, projection lights of three primary colors are projected onto the screen 32 by traveling through different optical paths after they exit from the projection lens. Hence, the images of three primary colors are misaligned when a projection distance to the screen 32 is changed. This configuration, therefore, needs complicated convergence adjustment (adjustment to superimpose images of three primary colors one on another in alignment).

In this regard, the units 10 according to the configurations #1 through #3, in which the optical unit adopts the single lens method, are preferable in that the mechanism for the convergence adjustment is not needed. However, exemplary embodiments of the invention are not limited to this configuration, and the projector 71 may adopt the triple-lens method by providing a related art mechanism for convergence adjustment. The fifth exemplary embodiment can be applied to any of the other embodiments.

Sixth Exemplary Embodiment

Hereinafter, the projection display device 1 of a sixth exemplary embodiment will be described by focusing differences from the first exemplary embodiment, and descriptions of the same components and functions are omitted herein.

In the unit 10 of the sixth exemplary embodiment, the projector main body 25, 26, or 27 (descriptions will be given using the projector main body 25 as a representative example) has an unlimited number of liquid crystal panels (not shown) in the interior. The projector main body 25 therefore can have a single liquid crystal panel or more than one liquid crystal panel. That is to say, the projector main body 25 may adopt a method of projecting a monochrome image or a color image displayed on a single liquid crystal panel, or a method of combining more than one display image and projecting combined display images. Related art projection methods within the scope obvious to anyone skilled in the art can be adopted. The sixth exemplary embodiment can be applied to each of the other exemplary embodiments.

Seventh Exemplary Embodiment

Hereinafter, the projection display device 1 of a seventh exemplary embodiment will be described by focusing differences from the first exemplary embodiment, and descriptions of the same components and functions are omitted herein.

In the unit 10 of the seventh exemplary embodiment, known image display devices within the scope obvious to anyone skilled in the art can be adopted as the image display device in the projector main body 25. For example, as the image display device in the projector main body 25, a type such that projects an image formed on the liquid crystal panel as described above may be adopted, or a reflection MEMS, such as a DMD (Digital Micro mirror Device) and a LCOS (Liquid Crystal On Silicon), or a type such that enlarges and projects a reflection micro liquid crystal device referred to as a D-ILA (Direct-Drive Image Light Amplifier), which is one type of LCOS, may be adopted.

Further, optical devices for the dot sequential scanning using a laser and a polygonal mirror, or a line sequential scanning using a linear MEMS and a rotating mirror are also applicable. The seventh exemplary embodiment can be applied to each of the other exemplary embodiments.

Eighth Exemplary Embodiment

Figure 17:
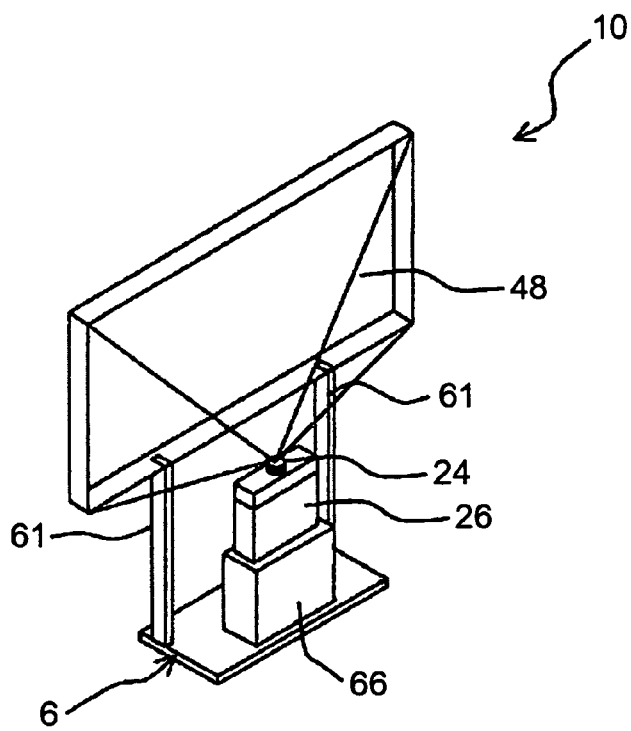
FIG. 17 is a schematic showing an eighth exemplary embodiment of the projection display device of the invention.

FIG. 17 is a schematic showing still another exemplary embodiment of the projection display device of exemplary embodiments of the invention.

Hereinafter, the projection display device 1 of the eighth exemplary embodiment will be described by focusing differences from the first exemplary embodiment, and descriptions of the same components and functions are omitted herein.

As is shown in FIG. 17, in the unit 10 of the eighth exemplary embodiment, the mirror 31 is omitted, and a dioptrics unit 24 is used instead. The dioptrics unit 24 includes a dioptric system and a lens barrel supporting the dioptric system, and is detachably provided to the projector main body 26.

The dioptric system constitutes the optical unit of the eighth exemplary embodiment. Also, the dioptrics unit 24 and the projector main body 26 together constitute the projector of the eighth exemplary embodiment.

Projection lights projected from the projector main body 26 undergo refraction in the dioptric system, and are projected directly onto the screen 32. This eliminates the need for the mirror 31 and the sub-frame 62, which allows the unit 10 not only to save a space, but also to be reduced in size. The eighth exemplary embodiment can be applied to each of the other exemplary embodiments.

Ninth Exemplary Embodiment

Hereinafter, the projection display device 1 of a ninth exemplary embodiment will be described by focusing differences from the first exemplary embodiment, and descriptions of the same components and functions are omitted herein.

In the unit 10 of the ninth exemplary embodiment, the mirror 31 is omitted, and a mirror is provided integrally inside the projection lens unit 22 instead. The projection lens unit 22 of the ninth exemplary embodiment includes a lens, a mirror, and a lens barrel supporting these mirror and lens.

In this case, it is preferable to use an aspherical mirror as the mirror. By using an aspherical mirror, it is possible to correct a keystone distortion and a focal point of an image to be projected onto the screen suitably. This configuration can further save a space. In comparison with a case where a mirror is provided separately, a deformation of the mirror itself can be reduced or prevented. Also, because the need for the sub-frame 62 is eliminated, an increase in cost can be minimized, which makes it possible to provide the projection display device 1 at a low cost. The ninth exemplary embodiment can be applied to each of the other exemplary embodiments.

Tenth Exemplary Embodiment

Figure 18:
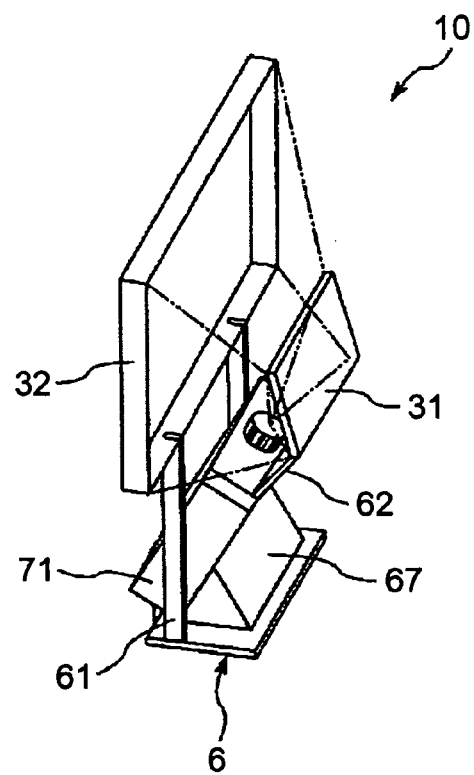
FIG. 18 is a schematic showing a tenth exemplary embodiment of the projection display device of the invention.
Figure 19:
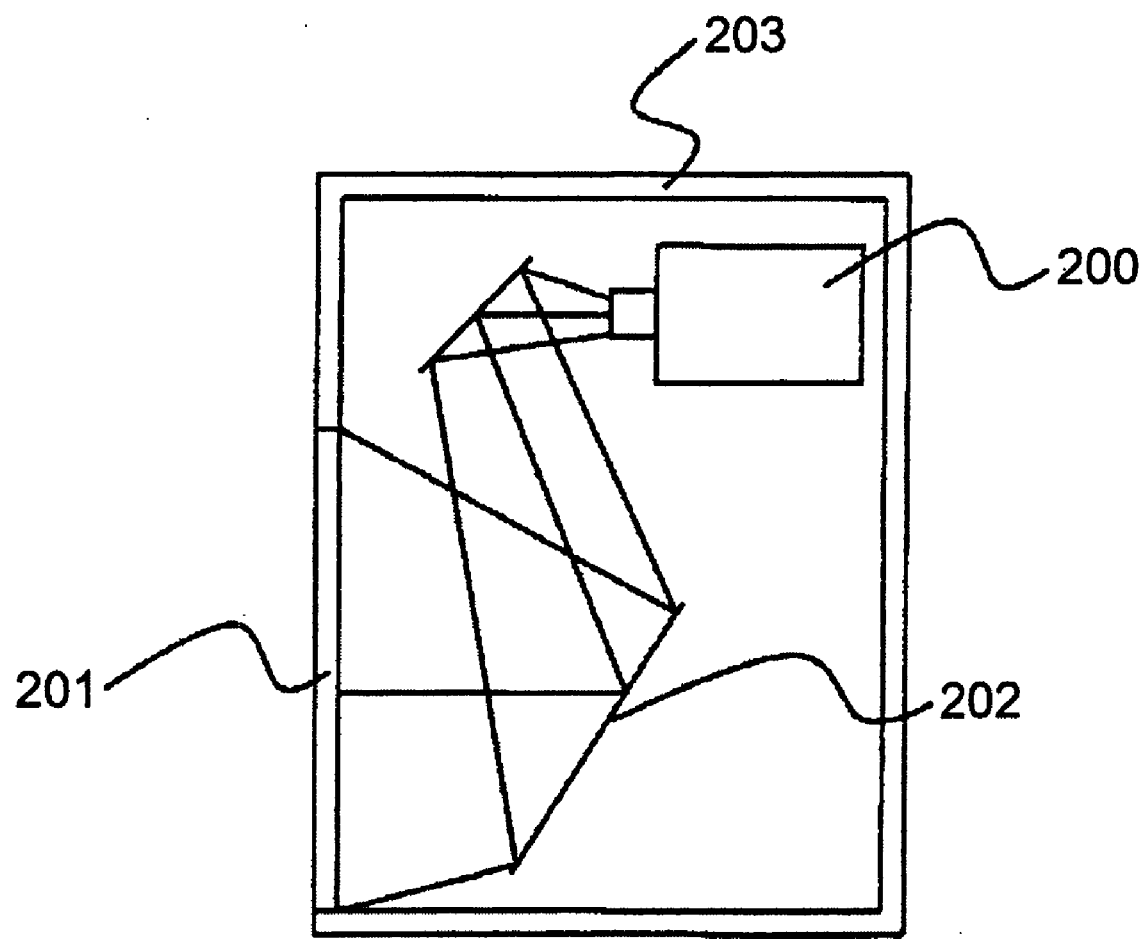
FIG. 19 is a schematic showing a projection display device in the related art.

FIG. 18 is a schematic showing a tenth exemplary embodiment of the projection display device of the invention.

Hereinafter, the projection display device 1 of the tenth exemplary embodiment will be described by focusing differences from the first exemplary embodiment, and descriptions of the same components and functions are omitted herein.

In the unit 10 of the tenth exemplary embodiment, the main frames 61 have a detachable mounting stand 67, and the projector 71 is detachably provided on the mounting stand 67. As is shown in FIG. 18, the projector 71 is provided on the lower side of the screen 32, that is, below the screen 32 in the vertical direction (on an extension with respect to the screen 32) while being tilted by a predetermined angle with respect to the screen 32. A space below the screen 32 can be thereby utilized, and the unit 10 can be reduced in size, particularly, in thickness. The tenth exemplary embodiment can be applied to each of the other exemplary embodiments.

While the projection display device 1 of exemplary embodiments the invention has been described by way of the exemplary embodiments shown in the drawings, exemplary embodiments of the invention are not limited to these exemplary embodiments. Configurations of the respective portions can be replaced with an arbitrary configuration having a similar function. Also, an arbitrary configuration may be added to exemplary embodiments of the invention.

Exemplary embodiments of the invention may be a combination of two or more configurations (characteristics) selected arbitrarily from the respective exemplary embodiments.

The projection display device 1 of exemplary embodiments of the invention was described to have plural kinds of screens, optical units, and projectors; however, exemplary embodiments of the invention are not limited to this configuration. For example, one of each may be selected at the time of purchase. This enables the user to obtain a desired unit at the minimum burden (lowest cost).

In the exemplary embodiments, the screens 32, 48, and 64 having, respectively, a 32-inch diagonal display region, a 48-inch diagonal display region, and a 64-inch diagonal display area were used as an example. However, the diagonal display region is not limited to these sizes, and screens of various screen sizes can be used as well (the same can be said for the optical unit and the projector main body).

The kind (number) of screens provided to the projection display device of exemplary embodiments of the invention is not limited to three, and it may be two or four or more.

The number of the optical units and the projector main bodies provided to the projection display device of exemplary embodiments of the invention is not particularly limited. It is sufficient to provide an optical unit and a projector main body compatible with the screen provided to the projection display device.

The projector 71 may be detached from the frame 6, and disposed on the front side of a reflection screen prepared separately, so that the projector 71 is used for projection by a method (front method) of displaying a display image onto the screen by projecting projection lights onto the reflection screen.

The projection lens unit 22 and the zoom lens unit may be furnished with an auto-focusing function.

What is claimed is:

1. A projection display device, comprising:
    plural transmission screens each provided with a back surface layer having optical directivity on a back surface side, the transmission screens each having an image display portion of a different dimension to which an image is displayed, and each having light transmissivity;

a projection device main body to project a projection light;

an optical unit to guide the projection light from the projection device main body to the back surface of the transmission screen; and a supporting unit to support one transmission screen selected from the plural transmission screens and the projection device main body, an image being displayed on the transmission screen by allowing the projection light guided by the optical unit to pass through from the back surface side; and one of the transmission screens being selected from the plural transmission screens, and the selected transmission screen, the projection device main body, the optical unit, and the supporting unit being assembled.

2. The projection display device according to claim 1, plural kinds of optical units compatible with the respective transmission screens being provided, and one kind of optical unit being selected from the plural kinds of optical unit for assembly.

3. The projection display device according to claim 1, plural kinds of projection device main bodies compatible with the respective transmission screens being provided, and one kind of projection device main body being selected from the plural kinds of projection device main bodies for assembly.

4. The projection display device according to claim 1, the optical unit including a mirror, and a light reflected on the mirror being projected onto the transmission screen.

5. The projection display device according to claim 4, the mirror being supported on the supporting unit.

6. The projection display device according to claim 4, a reflection surface of the mirror being a plane.

7. The projection display device according to claim 4, wherein:

a reflection surface of the mirror being substantially parallel to a vertical direction.

8. The projection display device according to claim 1, at least part of the optical unit being provided to the projection device main body.

9. The projection display device according to claim 1, the optical unit being provided to the projection device main body; and the optical unit having an optical system to allow a light to undergo refraction, and a projection light from the optical unit being projected onto the transmission screen.

10. The projection display device according to claim 1, the optical unit being provided to the projection device main body; and the optical unit including a mirror, and a light reflected on the mirror being projected onto the transmission screen.

11. The projection display device according to claim 1, the optical unit being provided with a variable power mechanism that changes an angle of view of an image to be displayed on the transmission screen.

12. The projection display device according to claim 1, the projection device main body being provided to tilt at a predetermined angle with respect to the transmission screen.

13. The projection display device according to claim 12, at least part of the projection device main body being provided on an extension of a surface of the image display portion of the transmission screen.

14. The projection display device according to claim 1, at least one of the plural transmission screens having flexibility; and the projection display device further including a screen adjusting unit that adjusts dimensions of the transmission screen having the flexibility.

15. The projection display device according to claim 1, the supporting unit being shaped like a frame, so that when the transmission screen, the projection device main body, the optical unit, and the supporting unit are assembled, the transmission screen, the projection device main body, and the optical unit are exposed to an outside.

16. The projection display device according to claim 1, the projection light being projected onto the selected transmission screen in a direction tilted by a predetermined angle, and the tilted direction and a direction along which the optical directivity of the transmission screen is set, at least almost agree with each other.

17. The projection display device according to claim 1, further comprising:

a front surface layer, formed on a light exiting-side of the back surface layer, on which strips of a light absorbing layer that absorbs a light from a predetermined direction are aligned in parallel and spaced at predetermined intervals.

18. The projection display device according to claim 1, further comprising:

a front surface layer formed on a light exiting-side of the back surface layer and being provided with plural minute concaves and convexes on a display surface side.

* * * * *